(12) United States Patent
Fang et al.

(10) Patent No.: US 7,623,303 B2
(45) Date of Patent: Nov. 24, 2009

(54) SOLID TUNABLE MICRO OPTICAL DEVICE AND METHOD

(75) Inventors: Weileun Fang, Hsinchu (TW); Sz-Yuan Lee, Hsinchu (TW); Hsi-Wen Tung, Hsinchu (TW); Wen-Chih Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 30 days.

(21) Appl. No.: 11/877,421

(22) Filed: Oct. 23, 2007

(65) Prior Publication Data
US 2009/0103170 A1 Apr. 23, 2009

(51) Int. Cl.
*G02B 1/04* (2006.01)
*G02B 13/00* (2006.01)
*G02B 3/14* (2006.01)

(52) U.S. Cl. .................. 359/724; 359/666; 359/665

(58) Field of Classification Search ............. 359/319, 359/642, 665, 666, 724, 741, 742, 619, 628; G02B 26/08
See application file for complete search history.

(56) References Cited

U.S. PATENT DOCUMENTS

| | | | | |
|---|---|---|---|---|
| 4,865,426 A | * | 9/1989 | Matsuoka et al. | 359/665 |
| 5,386,427 A | * | 1/1995 | Zayhowski | 372/34 |
| 6,124,974 A | * | 9/2000 | Burger | 359/621 |
| 6,366,369 B2 | * | 4/2002 | Ichikawa et al. | 359/12 |
| 6,930,838 B2 | * | 8/2005 | Schachar | 359/666 |
| 7,359,124 B1 | * | 4/2008 | Fang et al. | 359/666 |
| 7,440,193 B2 | * | 10/2008 | Gunasekaran et al. | 359/666 |

OTHER PUBLICATIONS

Wang, Weisong, Ji Fang, and Kody Varahramyan. "Compact Variable-Focusing Microlens with Integrated Thermal Actuator and Sensor." IEEE Photonics Technology Letters 17 (Dec. 2005): 2643-2645.*

* cited by examiner

*Primary Examiner*—Ricky L Mack
*Assistant Examiner*—Zachary Wilkes
(74) *Attorney, Agent, or Firm*—Volpe and Koenig, P.C.

(57) ABSTRACT

A solid tunable micro optical device for an micro-optical system is provided. The sold tunable micro optical device includes a first annular piece, a micro-lens with a spherical surface configured on the first annular piece, and a deforming device coupled to the first annular piece for deforming the micro-lens.

17 Claims, 6 Drawing Sheets

SOLID TUNABLE MICRO OPTICAL DEVICE AND METHOD

FIELD OF THE INVENTION

The present invention relates to a tunable optical device, and more particularly to a solid-state micro-lens with tuning capability in a micro-optical system.

BACKGROUND OF THE INVENTION

Typical tunable micro-lenses existing in reports can be categorized as three types. The first category is the electrowetting tunable lenses. After a large electric field is applied at the interface of a liquid lens and a solid structure, the contact angle as well as the surface profile of the liquid lens are changed. The interface friction and the evaporation of liquid problems cannot be ignored. The second category is the liquid-filled lens approach. The main idea is to deform a liquid-filled chamber, which acts as a lens, via an external pressure source. This approach provides a large tuning range. However, an additional pressure source is required, and the self-weight of the liquid may introduce an undesired deformation. The third category is the liquid crystal immersed approach. This method directly changes a refraction index of a liquid crystal to modify the focal length. However it is difficult to realize a Micro-Opto-Electro-Mechanical System (MOEMS) due to the severe optical aberration induced by fringe effects.

The complicated fabrication process and complex control requirements of the above tunable micro-lenses significantly limit the potential applications. Furthermore, it is difficult to miniaturize the above tunable micro-lenses to a millimeter scale or a even smaller scale. The requirements of easy fabrication and integration are hard to be satisfied simultaneously by the existing approaches.

Hence, because of the defects in the prior arts, the inventors provide a solid tunable micro optical device to effectively overcome the demerits existing in the prior arts. In comparison with other tunable micro-lens systems, the present invention has the following characteristics. Firstly, the tunable lens of the present invention is composed of only solid-state polymer material, and no phase transition is required during operation. Secondly, the fabrication process for the present invention is easy and has a very high yield rate. Thirdly, the device of the present invention requires no extra pumping system, which is required in a liquid filled lens system, so that the tunable micro-lens of the present invention can be stand-alone. These characteristics make the device of the present invention suitable to be integrated with micro-optical systems.

SUMMARY OF THE INVENTION

It is an aspect of the present invention to provide a solid tunable micro optical device having the facility in the fabrication and the capability of integrating with various optical components into a single piece for solving problems resulting from a liquid-state lens.

In accordance with an aspect of the present invention, a solid tunable micro optical device is provided. The solid tunable micro optical device comprises a first ring with a first outer contour and a first inner contour; a first micro-lens with a first spherical surface configured on the first ring; a second ring with a second outer contour and a second inner contour surrounding the first ring; a second micro-lens with a second spherical surface configured on the second ring and mounted above the first ring and the first micro-lens; and a temperature-adjusting device adjusting at least one of a temperature of the second ring and a temperature of the first ring, and deforming at least one of the first and the second micro-lenses thereby.

Preferably, the solid tunable micro optical device further comprises a substrate mounting thereon the first and the second rings and transparent to at least one wavelength of a light.

Preferably, the solid tunable micro optical device further comprises at least one of a grating and a diffractive optical element configured on at least one surface of the substrate for modifying the light passing through the first and the second micro-lenses.

Preferably, the solid tunable micro optical device further comprises a reflective material configured on at least one of the first and the second spherical surfaces.

Preferably, at least one of the first outer contour, the second outer contour, the first inner contour and the second inner contour is elliptic.

Preferably, at least one of the first outer contour, the second outer contour, the first inner contour and the second inner contour is skew to the light.

Preferably, the first spherical surface of the first micro-lens is one of a convex surface and a concave surface and the second spherical surface of the second micro-lens is one of a convex surface and a concave surface.

In accordance with another aspect of the present invention, a solid tunable micro optical device is provided. The solid tunable micro optical device comprises a first annular piece; a micro-lens with a spherical surface configured on the first annular piece; and a deforming device coupled to the first annular piece for deforming the micro-lens.

Preferably, the solid tunable micro optical device further comprises a substrate mounting thereon the first annular piece and being transparent to at least one wavelength of a light.

Preferably, the solid tunable micro optical device further comprises at least one of a grating and a diffractive optical element configured on at least one surface of the substrate for modifying the light passing through the micro-lens.

Preferably, the material of the diffractive optical element is different form that of the micro-lens.

Preferably, the substrate is made of an insulating material.

Preferably, the annular piece is made of a material with a high Young's modulus and a small coefficient of thermal expansion (CTE).

Preferably, the deforming device is a heater deforming at least one of the first annular piece and the micro-lens by heating.

Preferably, the solid tunable micro optical device further comprises a reflective material configured on the spherical surface of the micro-lens.

Preferably, the first annular piece is a ring having an outer contour and an inner contour and at least one of the outer contour and the inner contour is elliptic.

Preferably, the first annular piece is a ring having an outer contour and an inner contour and at least one of the outer contour and the inner contour is skew to the light.

Preferably, the spherical surface of the micro-lens is one of a convex surface and a concave surface.

In accordance with another aspect of the present invention, a method for tuning a solid tunable micro optical device is provided. The method comprises steps of providing an annular piece, providing a micro-lens with a spherical surface on the annular piece; and deforming the micro-lens by changing a temperature of at least one of the annular piece and the micro-lens.

Preferably, the method further comprises a step of providing a substrate transparent to at least one wavelength of a light and configuring at least one of a grating and a diffractive optical element on at least one surface of the substrate for modifying the light passing through the micro-lens.

Preferably, the step of providing the annular piece comprises the steps of depositing a semiconductor layer on the substrate and photolithographing the semiconductor layer. The step of providing the micro-lens with the spherical surface on the annular piece comprises the steps of configuring a polymer drop onto the annular piece and curing the polymer drop by heating.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1A:
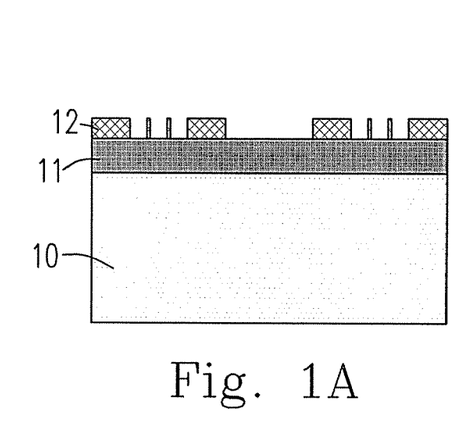
FIGS. 1A-1C are diagrams showing the fabricating process of a solid tunable micro-optical device according to a first embodiment of the present invention.
Figure 1B:
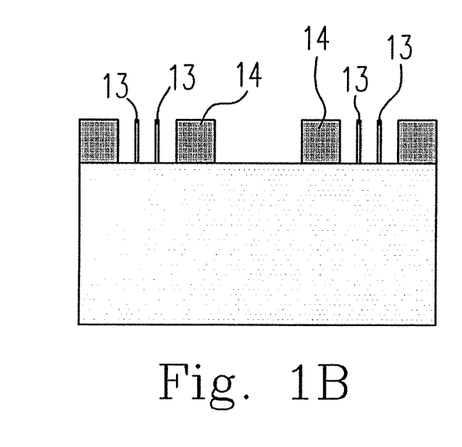
Figure 1C:
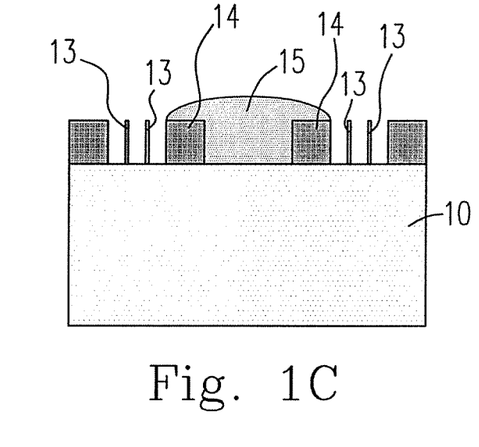

Please refer to FIGS. 1A, 1B and 1C, which are diagrams showing the fabricating process of a solid tunable micro-optical device according to a first embodiment of the present invention. A simple planar fabrication process is established to fabricate the solid tunable micro optical device and further to integrate with other optical components. As shown in FIG. 1A, the process starts on a silicon-on-glass (SOG) wafer, wherein the glass substrate 10 and the silicon layer 11 is used for fabricating micro components. A photomask pattern 12 for the micro components is formed on the SOG wafer by a photolithography process and the silicon layer 11 is etched by a deep reactive ion etching (DRIE). After the photomask pattern 12 is removed, the micro components such as heaters 13 and a conducting ring 14 are formed on the glass substrate 10, as shown in FIG. 1B. A polymer polydimethylsiloxane (PDMS) is selected as the material for the micro-lens 15 of this embodiment and is dispensed into the space enclosed by the conducting ring 14. As shown in FIG. 1C, a spherical surface of the micro-lens 15 is automatically formed due to the surface tension of the PDMS. The spherical surface of the micro-lens 15 is a convex surface in this embodiment; however it could be a concave surface as well. The final step is to cure the PDMS at 150° C. for 15 min for turning the PDMS to a solid state.

Figure 2A:
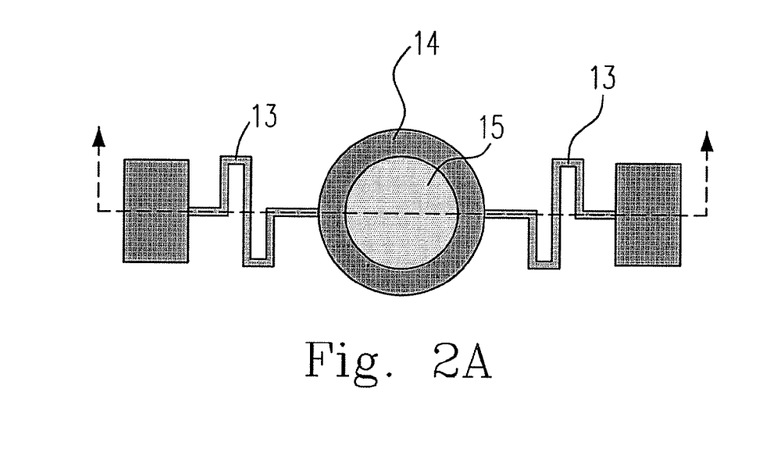
FIG. 2A is a diagram showing the top view of a solid tunable micro-optical device according to the first embodiment of the present invention.
Figure 2B:
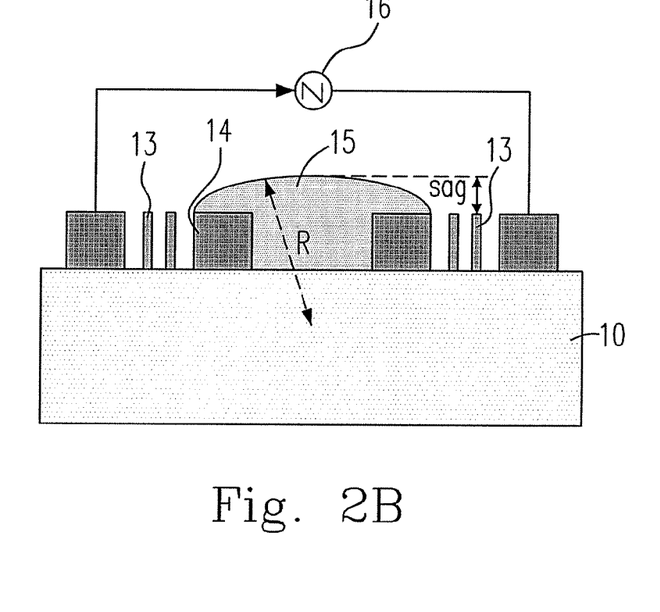
FIG. 2B is a diagram showing the side view of a solid tunable micro-optical device according to the first embodiment of the present invention.

Please refer to FIGS. 2A and 2B, which are diagrams showing the top view and the side view of a solid tunable micro-optical device according to the first embodiment of the present invention, respectively. The device made by the fabricating process shown in FIGS. 1A-1C comprises a conducting ring 14, a micro-lens 15 with a spherical surface configured on the conducting ring 14, and a pair of heaters 13. The heaters 13 are electrically connected to a power source 16 for actuating the heaters 13. Applying electric power to the heaters 13 may changes the temperature of the conducting ring 14 and the micro-lens 15. Hence, the micro-lens 15 is deformed and results in a variation of a radius of curvature (ROC) of the micro-lens 15.

Please refer to FIGS. 2A and 2B again. When a current is applied to the solid tunable micro-lens device, as illustrated in FIG. 2A, the heaters 13 increase the temperature of the conducting ring 14 and the micro-lens 15. According to the difference of the thermal expansion and the stiffness between the conducting ring 14 and the micro-lens 15, a thermal deformation is induced, which leads to the variation of the radius of curvature (ROC) of the micro-lens 15, as well as the focal length of micro-lens 15. The variation is easily controlled by managing the current input to the device. However, besides the heaters 13 mentioned in this embodiment, the temperature of the conducting ring 14 or the micro-lens 15 could also be controlled by other temperature-adjusting devices. According to the first embodiment of the present invention, the driving current could be reduced and the tunable range could be increased through the optimal design of the conducting ring 14 and the heaters 13. In sum, the solid tunable micro optical device of the present invention has simple and reliable thermal expansion of the solid material, and the phase transition is not required during operation.

Second Embodiment

Figure 3A:
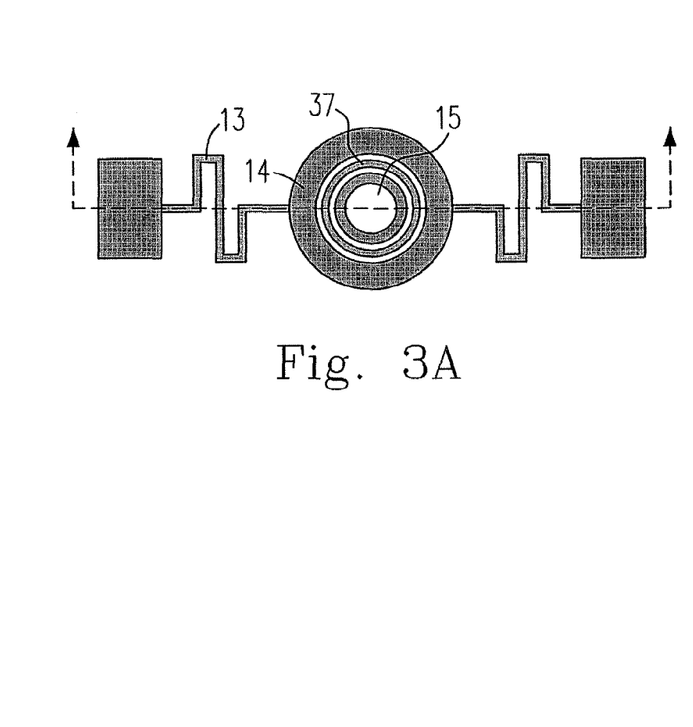
FIG. 3A is a diagram showing the top view of a solid tunable micro-optical device according to a second embodiment of the present invention.
Figure 3B:
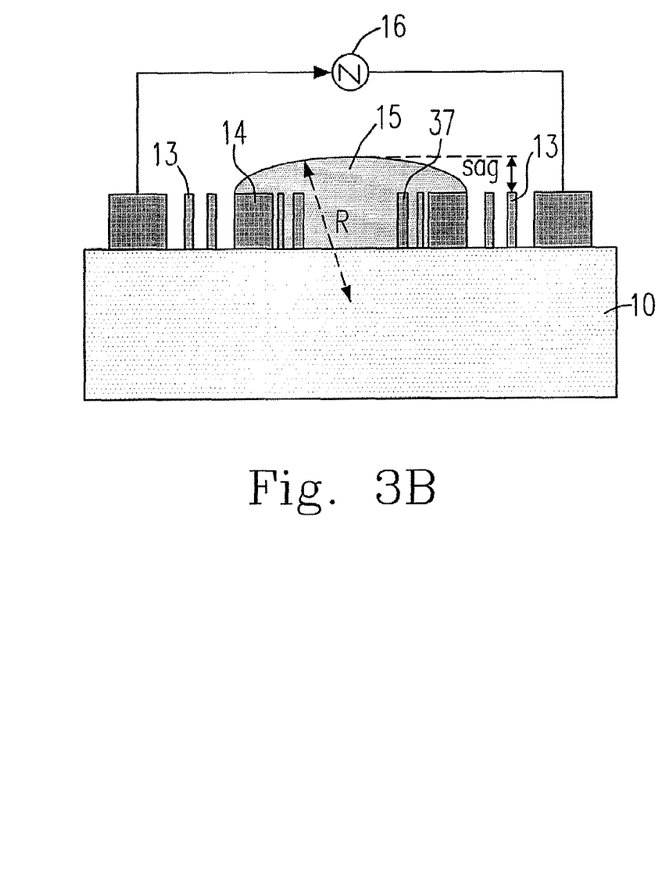
FIG. 3B is a diagram showing the side view of a solid tunable micro-optical device according to the second embodiment of the present invention.

Please refer to FIGS. 3A and 3B, which are diagrams showing the top view and the side view of a solid tunable micro-optical device according to a second embodiment of the present invention. The solid tunable micro-lens device in the first embodiment can be integrated with at least one optical component, such as a grating or a Fresnel lens. The second embodiment is performed by integrating a Fresnel lens 37 into the solid tunable micro-lens device in the first embodiment to form a compound micro-lens. In this embodiment, the Fresnel lens 37 is simultaneously fabricated and integrated with the conducting ring 14 and the heaters 13 without additional masks or processes, and an alignment during the fabrication is unnecessary as well. Besides the arrangement of the Fresnel lens 37 in this embodiment, the Fresnel lens 37 can be configured on one side of the glass substrate 10 by sputtering or other thin-film forming methods as well. The added Fresnel lens 37 can further shorten the focal length of the micro-lens 15 to form a two-lens system with a higher numerical aperture (NA). The Fresnel lens in this embodiment could be a multi-focus lens, which can provides the compound lens with a higher NA and more focal points.

Third Embodiment

Figure 4A:
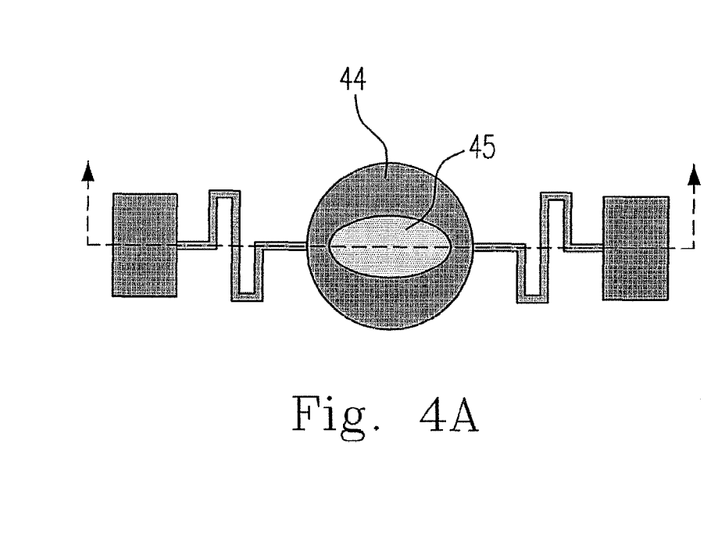
FIG. 4A is a diagram showing the top view of a solid tunable micro-optical device according to a third embodiment of the present invention.
Figure 4B:
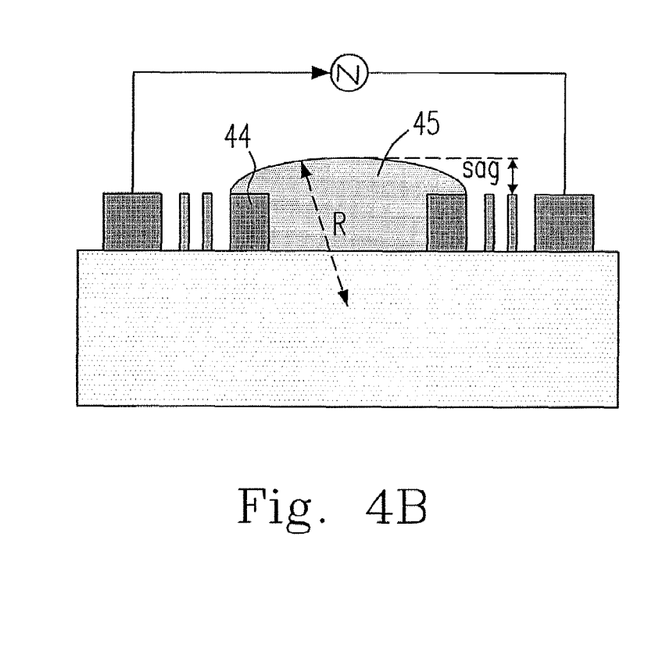
FIG. 4B is a diagram showing the side view of a solid tunable micro-optical device according to the third embodiment of the present invention.

Please refer to FIGS. 4A and 4B, which are diagrams showing the top view and the side view of a solid tunable micro-optical device according to the third embodiment of the present invention. The third embodiment is similar to the first embodiment except that the conducting ring 44 of the third embodiment has an asymmetric central aperture. In the third embodiment, the asymmetry aperture leads to different variations of the ROC of the micro-lens 45 in X-plane and Y-plane in response to a temperature change. Therefore, controlling temperature tunes the astigmatism of the micro-lens 45. Consequently, the third embodiment of the present invention can compensates an astigmatism existing in an optical system by an asymmetric deformation of the micro-lens 45 with different ROC along the X-plane and the Y-plane.

Forth Embodiment

Figure 5A:
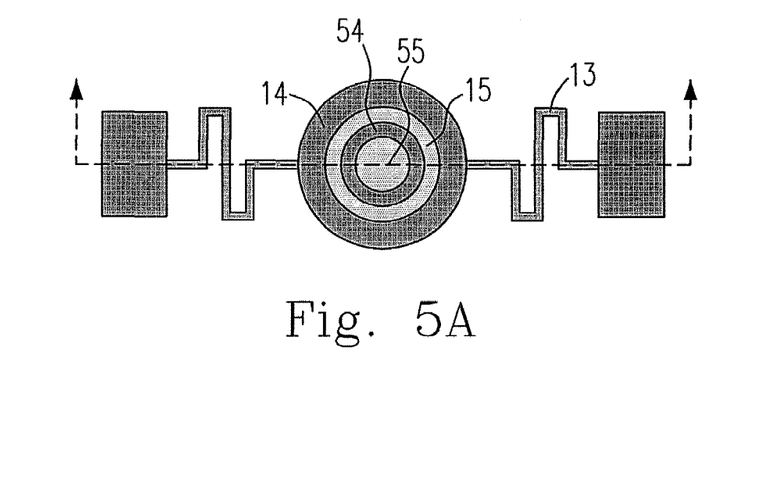
FIG. 5A is a diagram showing the top view of a solid tunable micro-optical device according to a fourth embodiment of the present invention.
Figure 5B:
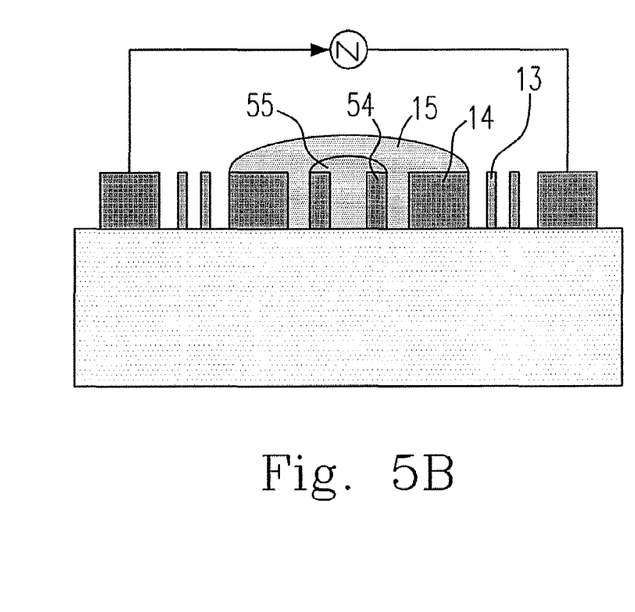
FIG. 5B is a diagram showing the side view of a solid tunable micro-optical device according to the fourth embodiment of the present invention.

Please refer to FIGS. 5A and 5B, which are diagrams showing the top view and the side view of a solid tunable micro-optical device according to the fourth embodiment of the present invention. Compared with the first embodiment of the present invention, the fourth embodiment comprises a further conducting ring 54 and a further micro-lens 55 inside or outside the original conducting ring 14 and micro-lens 15 in the first embodiment of the present invention. The original micro-lens 15 and the further micro-lens 55 form a compound lens. When a current is applied to the solid tunable micro-lens device, as illustrated in FIG. 5A, the heaters 13 increase the temperature of the conducting ring 14 and the heat also conducts to the micro-lens 15, the further conducting ring 54 or the further micro-lens 55. The surface deformation of the micro-lens 15 and/or the further micro-lens 55 changes the ROC as well as the focal length of the compound micro-lens. The present embodiment employs this concept to tune the focal length of the compound micro-lens by varying the temperature of the compound micro-lens, which is easily controlled by managing the current input to the device.

Fifth Embodiment

Figure 6:
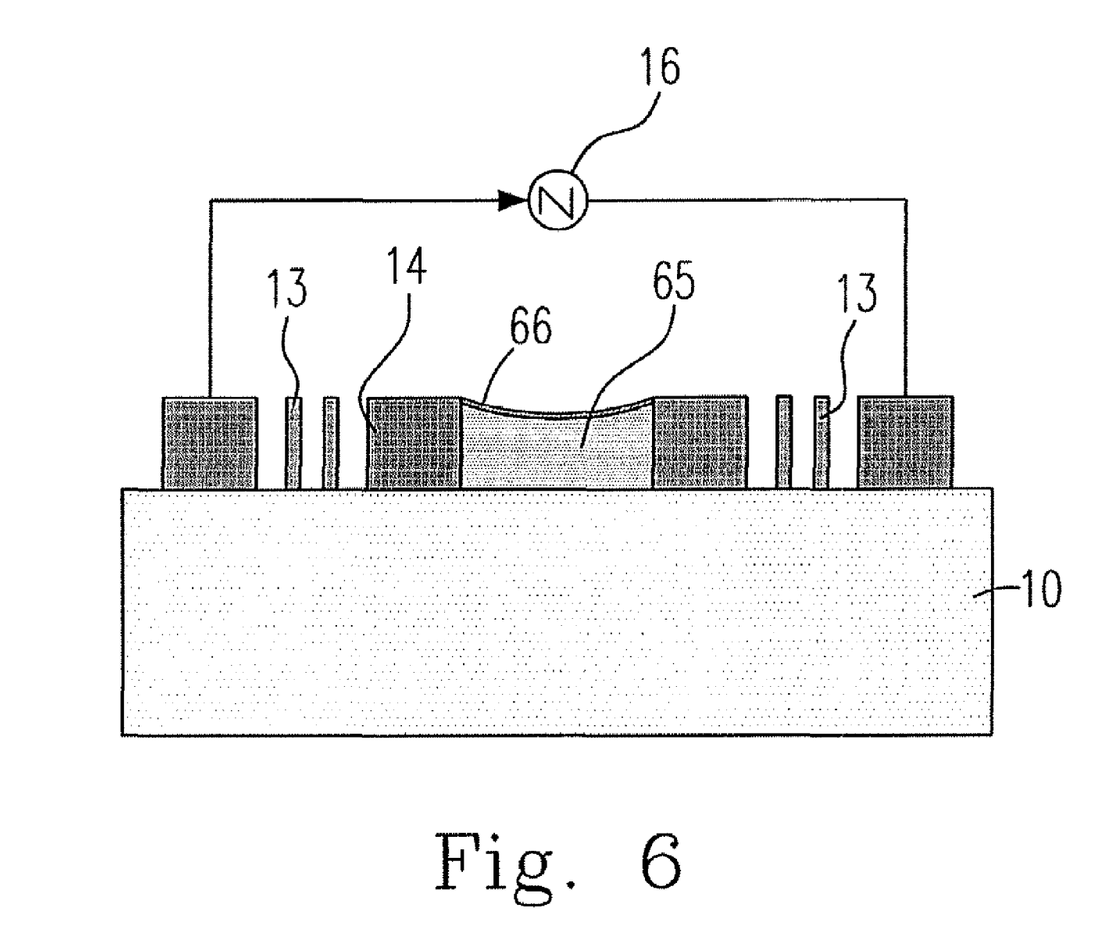
FIG. 6 is a diagram showing the side view of a solid tunable micro-optical device according to the fifth embodiment of the present invention.

Please refer to FIG. 6, which is a diagram showing the side view of a solid tunable micro-optical device according to the fifth embodiment of the present invention. The fifth embodiment is performed by coating a reflective material 66 or an anti-reflective material onto the surface of the micro-lens 65 for reflecting light or allowing a much higher percentage of light to pass through the micro-lens. The reflective material 66 can be made by silver, gold, optical thin films or any reflective materials, and the anti-reflective material is preferably a optical band gap material or a optical thin film.

The concept of the present invention is to tune a micro-lens by heat, especially by heat adjusted by an input current. Any form of heaters and the shapes of the conducting ring should all be included in the protecting scope of the present invention.

While the invention has been described in terms of what is presently considered to be the most practical and preferred embodiments, it is to be understood that the invention needs not be limited to the disclose embodiments. Therefore, it is intended to cover various modifications and similar arrangements included within the spirit and scope of the appended claims, which are to be accorded with the broadest interpretation so as to encompass all such modifications and similar structures.

What is claimed is:

1. A solid tunable micro optical device comprising:
   a first ring with a first outer contour and a first inner contour;
   a first micro-lens with a first spherical surface configured on the first ring;
   a second ring with a second outer contour and a second inner contour surrounding the first ring;
   a second micro-lens with a second spherical surface configured on the second ring and mounted above the first ring and the first micro-lens; and
   a temperature-adjusting device adjusting at least one of a temperature of the second ring and a temperature of the first ring, and deforming at least one of the first and the second micro-lenses thereby.

2. A solid tunable micro optical device as claimed in claim 1, further comprising a substrate mounting thereon the first and the second rings and transparent to at least one wavelength of a light.

3. A solid tunable micro optical device as claimed in claim 2, further comprising at least one of a grating and a diffractive optical element configured on at least one surface of the substrate for modifying the light passing through the first and the second micro-lenses.

4. A solid tunable micro optical device as claimed in claim 1, further comprising a reflective material configured on at least one of the first and the second spherical surfaces.

5. A solid tunable micro optical device as claimed in claim 1, wherein at least one of the first outer contour, the second outer contour, the first inner contour and the second inner contour is elliptic.

6. A solid tunable micro optical device as claimed in claim 1, wherein the first spherical surface of the first micro-lens is one of a convex surface and a concave surface and the second spherical surface of the second micro-lens is one of a convex surface and a concave surface.

7. A solid tunable micro optical device comprising:
   a first annular piece;
   a micro-lens with a spherical surface surrounded by the first annular piece; and
   a deforming device coupled to the first annular piece for deforming the micro-lens,
   wherein the first annular niece is a ring having an outer contour and an inner contour, and at least one of the outer contour and the inner contour is elliptic.

8. A solid tunable micro optical device as claimed in claim 7, further comprising a substrate mounting thereon the first annular piece and being transparent to at least one wavelength of a light.

9. A solid tunable micro optical device as claimed in claim 8, further comprising at least one of a grating and a diffractive optical element configured on at least one surface of the substrate for modifying the light passing through the micro-lens.

10. A solid tunable micro optical device as claimed in claim 8, wherein the substrate is made of an insulating material.

11. A solid tunable micro optical device as claimed in claim 7, wherein the deforming device is a heater deforming at least one of the first annular piece and the micro-lens by heating.

12. A solid tunable micro optical device as claimed in claim 7, further comprising a reflective material configured on the spherical surface of the micro-lens.

13. A solid tunable micro optical device as claimed in claim 7, wherein the spherical surface of the micro-lens is one of a convex surface and a concave surface.

14. A solid tunable micro optical device as claimed in claim 7, further comprising:
   a second annular piece; and
   another micro-lens configured on the second annular piece, wherein the second annular piece and the another micro-lens are configured inside the first annular piece, and the deforming device further deforms the another micro-lens for tuning a focus of the micro-lenses.

15. A method for tuning a solid tunable micro optical device, comprising steps of:
   providing an annular piece;
   configuring a polymer drop onto the annular piece;
   curing the polymer drop by heating for providing a micro-lens with a spherical surface surrounded by the annular piece; and
   deforming the micro-lens by changing a temperature of at least one of the annular piece and the micro-lens.

16. A method as claimed in claim 15, further comprising a step of providing a substrate transparent to at least one wavelength of a light and configuring at least one of a grating and a diffractive optical element on at least one surface of the substrate for modifying the light passing through the micro-lens.

17. A method as claimed in claim 16, wherein the step of providing the annular piece comprises:
   depositing a semiconductor layer on the substrate; and
   photolithographing the semiconductor layer.

* * * * *